US011772070B2

(12) United States Patent
Riva et al.

(10) Patent No.: US 11,772,070 B2
(45) Date of Patent: Oct. 3, 2023

(54) FOOD PACKAGE FOR AMINES CONTROL OR REMOVAL

(71) Applicant: SAES GETTERS S.P.A., Lainate (IT)

(72) Inventors: Miriam Riva, Lomazzo (IT); Paolo Vacca, Milan (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 17/777,342

(22) PCT Filed: Nov. 23, 2020

(86) PCT No.: PCT/EP2020/083094
§ 371 (c)(1),
(2) Date: May 17, 2022

(87) PCT Pub. No.: WO2021/105065
PCT Pub. Date: Jun. 3, 2021

(65) Prior Publication Data
US 2022/0401919 A1    Dec. 22, 2022

(30) Foreign Application Priority Data
Nov. 29, 2019 (IT) .................. 102019000022509

(51) Int. Cl.
*B01J 20/28* (2006.01)
*B01J 20/18* (2006.01)
*B65D 81/26* (2006.01)

(52) U.S. Cl.
CPC ......... *B01J 20/2805* (2013.01); *B01J 20/186* (2013.01); *B01J 20/28004* (2013.01); *B01J 20/28026* (2013.01); *B65D 81/266* (2013.01); *B65D 81/268* (2013.01); *B01J 2220/42* (2013.01); *B01J 2220/66* (2013.01)

(58) Field of Classification Search
CPC .............. B01J 20/2805; B01J 20/28004; B01J 20/28026; B01J 2220/42; B01J 2220/66; B01J 20/16–186; B01J 20/12; B01J 29/04; B01J 29/005; B01J 29/06–80; B01J 29/048; B01J 29/085; B65D 81/266; B65D 81/268; B65D 81/267
See application file for complete search history.

(56) References Cited

U.S. PATENT DOCUMENTS

| 3,013,984 | A | * | 12/1961 | Breck | B01J 20/186 208/2 |
|---|---|---|---|---|---|
| 3,334,964 | A | * | 8/1967 | Reid, Jr. | C01B 33/2861 423/DIG. 25 |
| 5,236,878 | A | * | 8/1993 | Inoue | B01D 53/8678 502/68 |
| 5,374,335 | A | * | 12/1994 | Lindgren | D21H 23/18 162/158 |
| 2002/0012760 | A1 | * | 1/2002 | Barry | C08K 9/02 428/35.7 |
| 2012/0258852 | A1 | * | 10/2012 | Martinez | B01J 35/002 423/700 |
| 2014/0087034 | A1 | * | 3/2014 | McKedy | B65D 81/2084 206/204 |
| 2017/0311637 | A1 | * | 11/2017 | Colombo | A23L 3/3427 |
| 2018/0229175 | A1 | * | 8/2018 | Pontonio | B01J 20/183 |
| 2022/0212941 | A1 | * | 7/2022 | Senoo | C01B 39/46 |

FOREIGN PATENT DOCUMENTS

| EP | 0476901 A2 | * | 3/1992 | |
| JP | H0742208 B2 | * | 1/1992 | |
| JP | 04255767 A | * | 9/1992 | |
| JP | H04-255767 A | | 9/1992 | |
| JP | H06-40958 A | | 2/1994 | |
| JP | H10-7875 A | | 1/1998 | |
| JP | 2008148726 A | * | 7/2008 | |
| JP | 2016097207 A | * | 5/2016 | ............... A23B 4/24 |
| KR | 0149195 B1 | * | 10/1998 | |
| KR | 100610468 B1 | * | 8/2006 | |
| WO | WO-0026100 A1 | | 5/2000 | |
| WO | WO-2013007328 A1 | * | 1/2013 | ............... A23B 4/24 |
| WO | WO-2017141159 A1 | * | 8/2017 | ............... B01D 53/04 |

OTHER PUBLICATIONS

Chung, Kyong-Hwan & Lee, Ki-Young. "Removal of trimethylamine by adsorption over zeolite catalysts and deodorization of fish oil." Journal of Hazardous Materials 172 (2009) 922-927 (Year: 2009).*
International Search Report and Written Opinion dated Apr. 16, 2021 in PCT/EP2020/083094, 22 pages.
Italian Search Report and Written Opinion dated Jun. 10, 2020 in Italian Patent Application No. IT201900023509, 11 pages.

\* cited by examiner

*Primary Examiner* — Viren A Thakur
(74) *Attorney, Agent, or Firm* — Element IP, PLC

(57) ABSTRACT

A food package suitable for manufacturing as a closed packaging system contains an amine-absorbent element comprising ammonium-exchanged mordenite (MOR) type zeolites and optionally further comprises ZnO-doped Faujasite (FAU) type zeolites and/or CuO-doped ZSM-5 type zeolites.

10 Claims, No Drawings

FOOD PACKAGE FOR AMINES CONTROL OR REMOVAL

The present invention relates to a food package for amines control or removal containing an amine-absorbent element comprising ammonium-exchanged mordenite (MOR) type zeolites.

Amines are organic derivatives of ammonia in which one, two or all three of the ammonia hydrogens are replaced by organic groups such as alkyl or aryl groups. This class of compounds have a typical nucleophilic behavior and, for this reason, they usually react through very fast kinetics with acyl compounds derived from carboxylic acids.

Amine moiety is ubiquitous in biology and, considering the application field of the present invention, one of the most interesting biological process is the amine release derived from the breakdown of amino acids. Specifically, processes like this are involved in fish decaying, and some compounds such as trimethylamine (TMA), dimethylamine (DMA) and ammonia are typically frequently associated with the spoilage of marine fish stored under ice. TMA in particular is one of the most characteristic spoilage metabolites of marine fish and, due to its intense ammonia-like and fishy off-odors, it is typically able to dominate other odors even at low concentrations. The impact of TMA on food spoilage depends on the animal species, on the applied atmosphere and on the storage temperature.

Despite amines detection can be easily managed, it is important to underline that this cannot represent an effective marker to determine the product quality deterioration. At the same time, these molecules smell bad and their accumulation in closed food packages can lead to consumer rejection of fresh food. In this regards, many efforts have been done to remove the produced amines to allow a reduction of the number of rejects but, so far, no efficient solution has been identified.

One possibility to solve the problem, as reported in WO 2014/052055, consists in the removal of the biogenic amines through the use of an acid reactant, generally a carboxylic acid, absorbed onto a carrier: the amines react with acids to form ammonium salts and consequently reducing the food odor. Another possible approach, disclosed by the same applicant in WO 2014/052053, describes a package for protein-containing foods comprising an oxidizer, typically hydrogen peroxide or sodium chlorite, absorbed onto a carrier. Also in this application, the aim of odor control is reached through the reaction of the active species with amines.

Therefore, it is clear that both methods described in the cited prior art do not use an absorbing approach to solve the odor problem related to protein rich foods but a converting approach, i.e. resulting in the formation of some reaction products. Zeolites are cited together with activated carbon, silica gel, cellulose paper and generic "absorbent polymers" just as potential carriers for the active species, but it is important to point out that the claimed processes may be too strong for the use of zeolites which, both in acid and oxidizing environment, would be destroyed.

Moreover, WO 2014/052053 discloses embodiments related to a releasable system as activated carbon and silica gel; specifically, the absorbed biogenic amine is released into the closed package and the oxidizer system reacts with the released amine to irreversibly retain it. It is therefore clear that the absorbing mechanism requires the coupling with other retaining systems, i.e. systems able to block the reaction products.

In the prior art, different documents describe the use of zeolites as odor-controlling adsorbent materials in various fields such as detergent compositions and cleansing bar compositions. U.S. Pat. Nos. 4,795,482 and 4,826,497 disclose zeolites having "high" silicate/aluminate ratios with a Si/Al ratio in the range 100-250; similarly, U.S. Pat. No. 5,211,870 reports to zeolites characterized by a Si/Al ratio between 100 and 250.

Other documents describe the use of zeolites as inorganic antimicrobial agents for items that come into contact with foods, such as a food tray in US 2002/012760 or a closure for a container for liquids in WO 00/26100. Another application of zeolites disclosed in the prior art is as components for compositions that can be used as a material for food packaging materials, such as in a method for producing 2,6-dialkylnaphthalene in JP H06/40958 or a propylene-α-olefin block copolymer composition in JP H10/7875.

It is an object of the present invention to provide a food package, manufactured as a closed packaging system, for amines odor control or removal in its enclosed volume, said food package containing an amine-absorbent element comprising ammonium-exchanged mordenite (MOR) type zeolites with a Si/Al atomic ratio comprised between 5 and 20.

The described composition is therefore characterized by a lower Si/Al ratio compared to the known ratios reported above, which brings to an increasing of total acidity improving both activity and selectivity of zeolites, and a strong affinity to amines.

In a preferred embodiment, said Si/Al ratio is comprised between 8 and 20.

MOR zeolites, suitable to be used in the present invention, are present in an amount comprised between 2 μg and 50 μg per gram of weight of an amines-releasing fresh food.

In some alternative embodiments of the present invention, the above cited MOR zeolites can be used in combination with other kind of zeolites suitable to remove amines.

For example, in order to increase the sorption capacity of the system while keeping high reversibility at low temperature (i.e. a temperature lower than 100° C.) it is possible to further add ZnO-doped Faujasite (FAU) type zeolites with a Si/Al atomic ratio comprised between 2 and 30. Indeed, according to TMA tests realized with the Temperature Program Desorption (TPD) technique on ZnO-doped zeolites, this metal oxide presence leads to an increase of the intensity of the first release peak at lower temperature and to a decrease of the temperature of the second release peak that occurs at higher temperature, that correspond to an overall increase of the sorption performance in the 25-100° C. range.

Said FAU zeolites are preferably present in an amount comprised between 1 μg and 40 μg per gram of weight of an amines-releasing fresh food.

Moreover ZSM-5, CuO-doped zeolites show a relevant component related to high energy acid sites. Thus, in order to obtain highest sorption capacity in the range comprised between 150-270° C., the amines-absorbent element of the herein disclosed food package can further comprise CuO-doped ZSM-5 type zeolites with a Si/Al atomic ratio comprised between 10 and 50 in an amount comprised between 1.5 μg and 40 μg per gram of weight of an amines-releasing fresh food.

According to the present invention, the zeolites are in the form of powders with an average size characterized by an $X_{90}$ between 0.2 μm and 10 μm where $X_{90}$ indicates the spherical diameter at which 90% of the particles in the sample are comprised in the given range on a volume basis. In some embodiments, the above-described zeolite powders are contained in a bag realized with a material selected in the group consisting of low density polyethylene (LDPE), high density polyethylene (HDPE), polypropylene (PP), ethylene-vinyl acetate (EVA), polystyrene (PS), styrene-ethylene-butylene-styrene (SEBS), polylactic acid (PLA), polyesters and biopolyesters.

Those bags can be placed in the internal volume of the package, preferably in the head space.

In other possible embodiments, said zeolite powders are dispersed in a polymeric matrix selected among acrylics, siloxanes and polysiloxanes, acrylics-styrene, -vinyl and alkyd copolymer, urethane-acrylics, aliphatic-urethanes, urethanes, polyesters, biopolyesters, epoxies, polyurethanes, polystyrene, phenolic resin, ethylene-vinyl alcohol (EVOH), polyvinyl alcohol (PVA) and waterborne or water reducible latex.

Said polymeric matrix can be realized in the form of a layer characterized by a thickness comprised between 0.5 and 50 μm and the possibility to be coated on a polymer or a cellulose paper substrate, or paper substrates deriving from agriculture and food waste.

The packaging system according to the present invention can be used for hermetically sealing foods which typically release amines during their spoilage. Thus, in a preferred embodiment said packaging system is a sealed bag or alternatively a film suitable for wrapping and closing a food container. Hereinafter, the invention will be explained in more detail with reference to the following examples.

EXAMPLE

MOR (NH4) is selected as sample S1, according to the present invention, and has an average size comprised between 2 μm and 10 μm and a Si/Al ratio of 10 as summarized in Table 1.

Similarly, samples S2-S5 have been prepared by mixing MOR zeolites with FAU and ZSM-5 ion-exchanged zeolites as reported in Table 1.

Comparative sample 1 (C1) MOR (H) zeolites are prepared by thermal treatment at 500° C. for 5 hours in air, from the same samples identical to the above S1. This thermal treatment allows to remove ammonium ions from the zeolite framework resulting in un-exchanged MOR (H) zeolites having an average size comprised between 2 μm and 10 μm and a Si/Al ratio of 10.

Comparative sample 2 (C2) ZnO-doped MOR (H) zeolites were prepared, first, by thermal treatment, at 500° C. for 5 hours in air, of the sample MOR (NH4) and then, by ion exchange process. MOR (H) zeolites have an $X_{90}$ comprised between 0.2 μm and 10 μm. 10 g of zeolites were dispersed in a solution of zinc salt (e.g. nitrate salt or acetate salt) then filtered on a filter paper and thermally treated to promote the solvent evaporation.

Resulting zinc-exchanged amount is about 2.4% wt over MOR zeolites weight, as evaluated by ICP Mass Spectrometry.

TABLE 1

Samples description

| Sample ID | $1^{st}$ zeolite | $1^{st}$ zeolite Si/Al atomic ratio | $1^{st}$ zeolite cation exchanged | $2^{nd}$ zeolite | $2^{nd}$ zeolite Si/Al atomic ratio | $2^{nd}$ zeolite cation exchanged | $1^{st}/2^{nd}$ zeolite ratio |
|---|---|---|---|---|---|---|---|
| S1 | MOR (NH4) | ~10 | NH4 | — | — | — | — |
| C1 | MOR (H) | ~10 | H+ | — | — | — | — |
| C2 | MOR (H) | ~10 | Zn | — | — | — | — |
| S2 | MOR | 10 | NH4 | FAU | 15 | Zn | 1 |
| S3 | MOR | 10 | NH4 | ZSM5 | 11.5 | Cu | 1 |
| S4 | MOR | 10 | NH4 | FAU | 15 | Zn | 0.43 |
| S5 | MOR | 10 | NH4 | ZSM5 | 11.5 | Cu | 0.43 |

Zeolites reported in Table 1 are tested under Temperature Program Desorption (TPD) technique to determine the kinetic and thermodynamic parameters of desorption process. Each sample is heated with a temperature program and the partial pressures of atoms and molecules evolving from the sample are detected.

The reactor is saturated under static conditions by injecting 10 cm³ of gaseous TMA left for 10 min at 30° C. After saturation, the reactor is connected on-line with the carrier flow, recording the release of TMA at the saturation temperature (dead volume). TPD is finally carried out up to 500° C.

The results are reported in the following table 2 in order to provide an overall picture for the tested zeolites. The zeolite characteristics and the correlation between results and zeolites characteristics are discussed below.

TABLE 2

Sample results

| Sample | desorbed TMA ($mmol/g_{zeo}$) | TMA sorption capacity (% wt) |
|---|---|---|
| S1 | 1.33 | 7.86 |
| C1 | 0.78 | 4.61 |
| C2 | 0.67 | 3.96 |
| S2 | 1.05 | 6.20 |
| S3 | 1.02 | 6.00 |
| S4 | 1.25 | 7.40 |
| S5 | 1.32 | 7.78 |

Considering the characterization results, all MOR zeolites exhibit larger acid sites (i.e. higher overall amine sorption amount) than other commercially available zeolites but sample S1 with ammonium-exchanged MOR zeolites ensures a higher amount of sorbed TMA if compared to comparative sample C1 with un-exchanged MOR. Sample C2, i.e. zinc oxide doped MOR zeolites, confirmed a lower overall TMA sorption capacity.

Furthermore, Samples S2-S5 have been prepared as mixture of MOR zeolites with FAU and ZSM-5 ion-exchanged zeolites, with the aim of proving the maintenance of high levels of TMA absorption, while improving the possible package applications. In fact, the addition of ZnO-doped Faujasite (FAU) type zeolites increases the sorption capacity of the system while keeping high reversibility at temperature lower than 100° C., or the use of CuO-doped ZSM-5 type zeolites, improves the sorption capacity in the range comprised between 150-270° C.).

The invention claimed is:

1. A food package manufactured as a closed packaging system and having an internal volume and a head space, for amines odor control or removal, said food package comprising an amines-releasing food and containing an amine-absorbent element comprising ammonium-exchanged mordenite type zeolites with a Si/Al atomic ratio between 5 and 20,
wherein said ammonium-exchanged mordenite type zeolites are present in an amount between 2 µg and 50 µg is per gram of weight of the amines-releasing food; and
the ammonium-exchanged mordenite type zeolites are in the form of powders with $X_{90}$ between 0.2 and 10 µm.

2. The food package according to claim 1, wherein said Si/Al atomic ratio is between 8 and 20.

3. The food package according to claim 1, wherein the amine-absorbent element further comprises ZnO-doped Faujasite type zeolites with a Si/Al atomic ratio between 2 and 30.

4. The food package according to claim 3, wherein said ZnO-doped Faujasite type zeolites are present in an amount between 1ug and 40 µg per gram of weight of the amines-releasing food.

5. The food package according to claim 1, wherein the amine-absorbent element further comprises CuO-doped ZSM-5 type zeolites with a Si/Al atomic ratio between 10 and 50.

6. The food package according to claim 5, wherein said CuO-doped ZSM-5 zeolites are present in an amount between 1.5 µg and 40 µg per gram of weight of the amines-releasing food.

7. The food package according to claim 1, wherein said powders are contained in a bag.

8. The food package according to claim 1, wherein the hag is composed of a material selected from the group consisting of low density polyethylene (LDPE), high density polyethylene (HDPE), polypropylene (PP), ethylene-vinyl acetate (EVA), polystyrene (PS), styrene-ethylene-butylene-styrene (SEBS), polylactic acid. (PLA), polyesters, and biopolyesters.

9. The food package according to claim 8, wherein the bag is placed in the internal volume of the food package.

10. The food package according to claim 9, wherein the bag is placed in the head space of the food package.

* * * * *